Nov. 2, 1954   W. MESSINGER   2,693,262
ELECTROMAGNETIC CLUTCH OPERATOR
Filed Nov. 6, 1950   2 Sheets-Sheet 1

INVENTOR.
WILLIAM MESSINGER
BY
HIS ATTORNEYS

Nov. 2, 1954 W. MESSINGER 2,693,262
ELECTROMAGNETIC CLUTCH OPERATOR
Filed Nov. 6, 1950 2 Sheets-Sheet 2

INVENTOR.
WILLIAM MESSINGER
BY
*Campbell, Brumbaugh, Free & Graves*
HIS ATTORNEYS

1

2,693,262

ELECTROMAGNETIC CLUTCH OPERATOR

William Messinger, Philadelphia, Pa.; The First National Bank of Philadelphia administrator of said William Messinger, deceased, assignor to Messinger Bearings, Inc., Philadelphia, Pa., a corporation of Pennsylvania Application November 6, 1950, Serial No. 194,342

1 Claim. (Cl. 192—84)

The engagement and disengagement of relatively rotating parts of substantial mass has frequently given rise to difficulties during operation of such mechanism, and clutch mechanisms of conventional form have not been found adequate to satisfy the severe requirements of service of this character. In accordance with the present invention, clutch mechanism has been provided by means of which relatively rotating parts of substantial mass and inertia may be engaged and disengaged to enable the rotation or movement of these masses to be synchronized without subjecting the engaging parts to disastrous or objectionable wear.

An object of the present invention, accordingly, is to provide a clutch mechanism by means of which relatively rotating parts of substantial mass may be effectively engaged and disengaged.

A further object of the present invention is to provide clutch mechanism of the above character wherein magnetically controlled elements are utilized to effect a desired frictional engagement to enable the relatively rotating parts of great mass to be brought into synchronous rotation.

Further objects of the invention will be apparent as it is described in greater detail in connection with the accompanying drawings, wherein.

Figure 1:
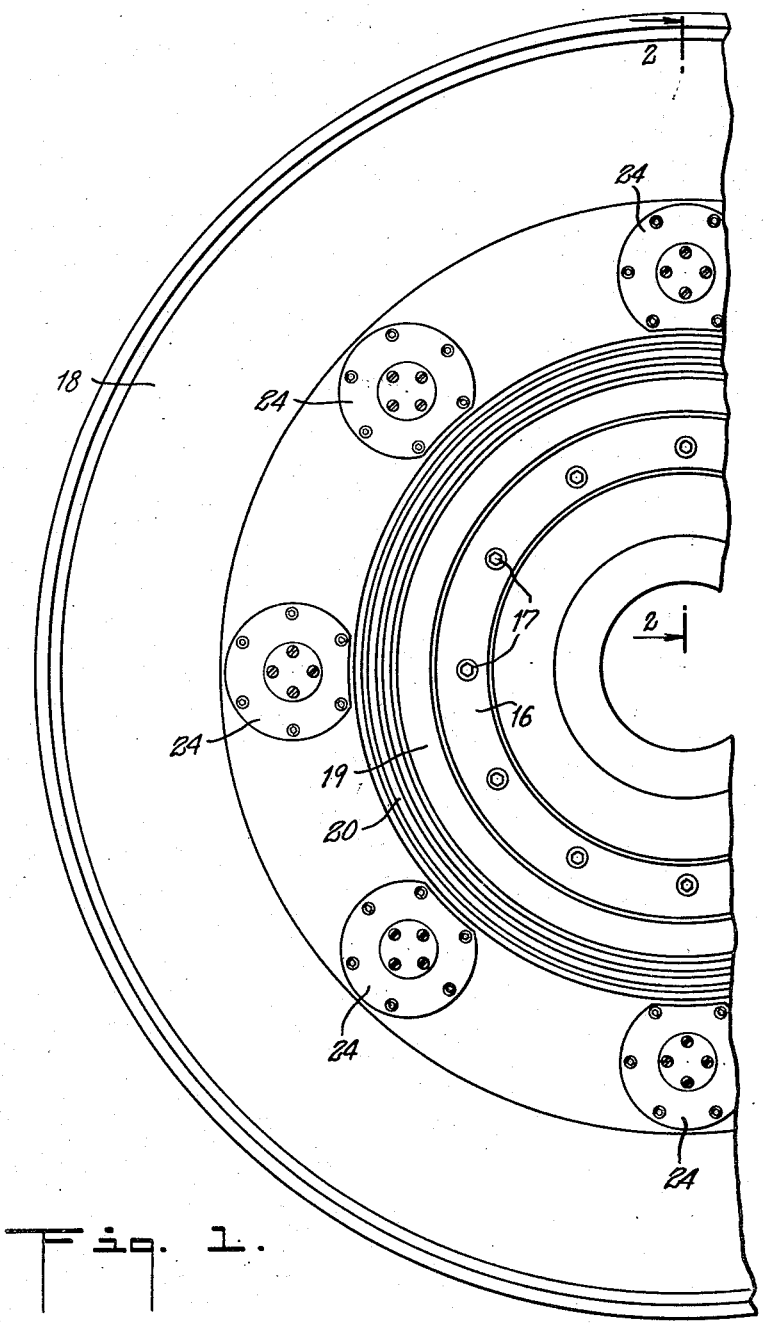
Figure 1 is a partial end view showing the clutch mechanism constructed in accordance with the present invention.

With reference to the accompanying drawings, the invention is illustrated as being embodied in a roll mechanism which may be typical of any rotating element of substantial mass, such as are utilized in the paper making, steel, printing, and similar industries. In these drawings, a roll 10 is shown in partial view as being carried upon a supporting structure 11 that may be carried by a shaft (not shown) suitably journaled in any supporting structure. The roll 10 is driven so that it normally rotates and, on its outer face, is provided with a circular magnetically-permeable armature 12 secured to the roll 10 by means of bolts 13. Also upon this end of the roll 10, a cylindrical member 14 is formed to receive a bearing 15 which may be of the X-type such as illustrated in United States Patent No. 2,430,359 to William Messinger for "Antifriction Thrust Bearing," dated November 4th, 1947.

Upon the bearing 15 is mounted a second rotatable member 18 which is normally non-rotating, but which at times may be required to rotate with the roll 10. For example, in the manufacture of paper, or in the coating thereof, the roll 10 may carry a web of paper and the rotatable member 18 may be the sheave of the so-called rope carrier by means of which the threading of the paper through the machine may be facilitated. Numerous other uses for this mechanism will be apparent as, for example, in the steel or similar industries where rotatable elements of substantial mass are to be operated under variably controlled conditions.

2

Figure 2:
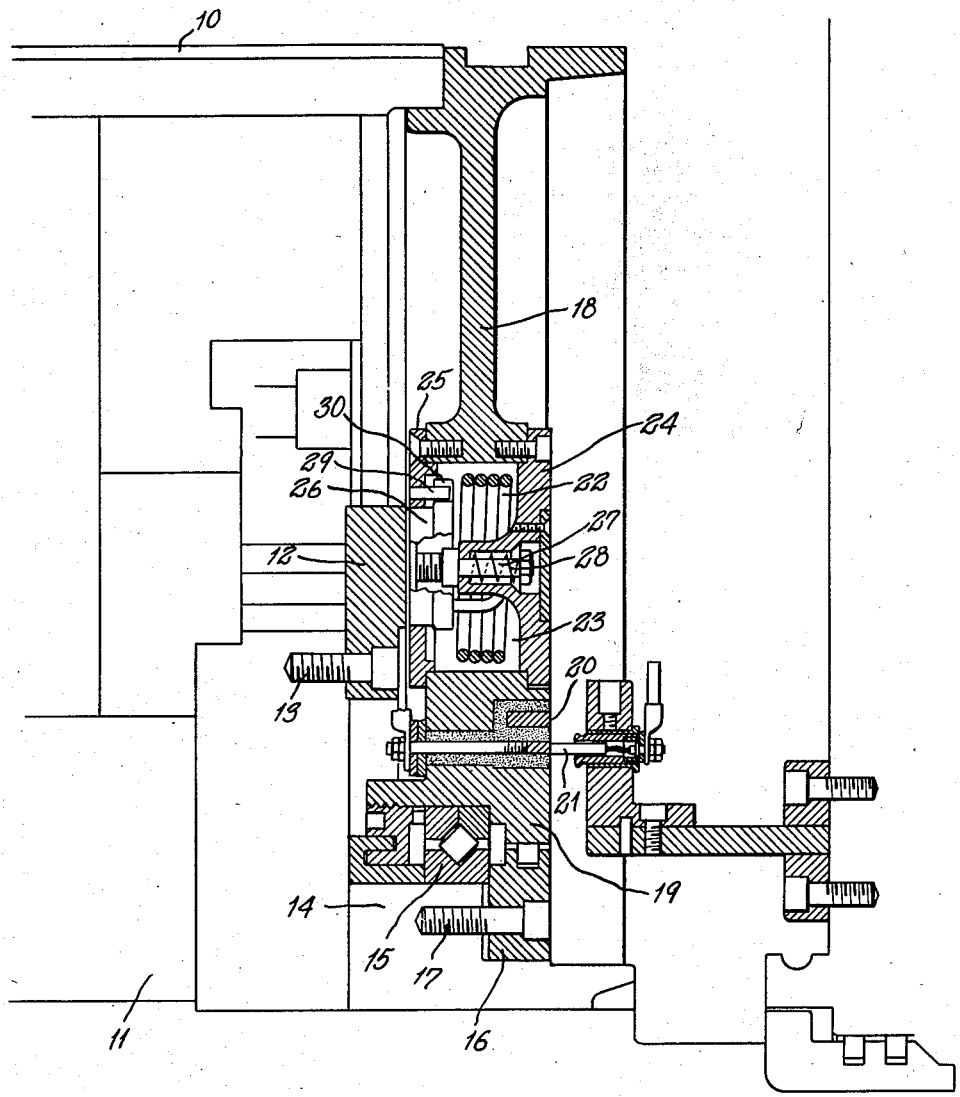
Figure 2 is a partial view in section, taken on the line 2—2 of Figure 1, and looking in the direction of the arrows.

The hub portion 19 of the sheave 18 not only provides the structure for mounting the sheave on the bearing 15, but also is formed with contact rings 20 having cooperating contact brushes 21 by means of which electric current may be furnished through a plurality of conductors 22 that are carried within the hub structure 19. To this end the hub 19 is formed with a plurality of recesses 23 within which the conductors 22 are received, these recesses being closed by outer plates 24 and inner plates 25. Each conductor 22 feeds electric current to a movable electromagnet 26 carried upon a stub shaft 27 that is slidable in the respective end plate 24 and normally urged to the right, as viewed in Figure 2, by means of a spring 28. Guide pins 29 are received in slots 30 carried by the magnets 26 and the outer faces are provided with a material of suitably high coefficient of friction in order to produce a desired frictional drag upon contact with the ring 12 carried by the roll 10. When the electromagnets 26 are energized by supplying current of a suitable value through the circuits, contact rings 20 and brushes 21 previously referred to, they are urged to the left as viewed in Figure 2 and thus caused to engage the circular armature ring 12. By controlling the amount of current flowing through the wires 22, the extent of frictional engagement may be varied, and thus the clutching effect of the mechanism suitably controlled. In this fashion, the sheave 18 may be caused to rotate with the roll 10 without subjecting any of the related parts of the machinery to objectionable stresses.

While the invention has been described with specific reference to the accompanying drawings, it is not to be limited save as defined in the appended claim.

I claim:

A magnetic clutch mechanism comprising a rotatable first member formed with a magnetically permeable flat faced annular armature on one end thereof, a rotatable second member formed with a flat annular face, means for coaxially mounting said first and second members with the annular armature opposite the flat annular face, a plurality of electromagnets each having a cylindrical front portion with a flat face, means forming a plurality of symmetrically spaced recesses around the second member, each of said recesses including a cylindrical opening extending inwardly a predetermined distance from the flat annular face of said second member, each of said electromagnets being axially slidably received in one of said recesses with the cylindrical front portion closely fitting the cylindrical opening, a spring associated with each of said electromagnets for resiliently retaining the electromagnet in its recess with the flat face thereof substantially flush with the flat annular face of said second member, conductor means in said second member connected to said electromagnets, said electromagnets adapted to be energized by selectively connecting said conductor means to an electrical source, said energized electromagnets engaging the annular armature to mechanically couple the first member to the second member.

References Cited in the file of this patent

UNITED STATES PATENTS

| Number | Name | Date |
|---|---|---|
| 341,981 | Woolson | May 18, 1886 |
| 432,209 | McLaughlin | July 15, 1890 |
| 905,797 | Davis | Dec. 1, 1908 |
| 1,031,081 | Miram et al. | July 2, 1912 |
| 1,446,225 | Thompson | Feb. 20, 1923 |
| 2,389,461 | Satterlee | Nov. 20, 1945 |

FOREIGN PATENTS

| Number | Country | Date |
|---|---|---|
| 47,326 | Austria | Apr. 10, 1911 |